US012593862B2

(12) United States Patent
Jung et al.

(10) Patent No.: US 12,593,862 B2
(45) Date of Patent: Apr. 7, 2026

(54) COATED PROBIOTIC, FOOD COMPOSITION CONTAINING THE SAME AND METHOD FOR PRODUCING THE SAME

(71) Applicant: HY CO., LTD., Seoul (KR)

(72) Inventors: Seong Eun Jung, Seoul (KR); Seung Hee Jung, Incheon (KR); Keon Heo, Gyeonggi-do (KR); Jae Jung Shim, Gyeonggi-do (KR); Jung Lyoul Lee, Gyeonggi-do (KR); Jae Hun Sim, Gyeonggi-do (KR)

(73) Assignee: HY CO., LTD., Seoul (KR)

( * ) Notice: Subject to any disclaimer, the term of this patent is extended or adjusted under 35 U.S.C. 154(b) by 812 days.

(21) Appl. No.: 17/608,549

(22) PCT Filed: Jun. 4, 2021

(86) PCT No.: PCT/KR2021/007036
§ 371 (c)(1),
(2) Date: Jul. 17, 2023

(87) PCT Pub. No.: WO2022/092472
PCT Pub. Date: May 5, 2022

(65) Prior Publication Data
US 2023/0380468 A1     Nov. 30, 2023

(30) Foreign Application Priority Data

Oct. 29, 2020    (KR) ........................ 10-2020-0141940

(51) Int. Cl.
| | |
|---|---|
| *A23L 33/135* | (2016.01) |
| *A23B 2/92* | (2025.01) |
| *A23L 33/105* | (2016.01) |
| *A23L 33/12* | (2016.01) |

(52) U.S. Cl.
CPC .............. *A23L 33/135* (2016.08); *A23B 2/92* (2025.01); *A23L 33/105* (2016.08); *A23L 33/12* (2016.08); *A23V 2400/113* (2023.08); *A23V 2400/125* (2023.08); *A23V 2400/137* (2023.08); *A23V 2400/143* (2023.08); *A23V 2400/145* (2023.08); *A23V 2400/147* (2023.08); *A23V 2400/165* (2023.08); *A23V 2400/169* (2023.08); *A23V 2400/173* (2023.08); *A23V 2400/175* (2023.08); *A23V 2400/249* (2023.08); *A23V 2400/515* (2023.08); *A23V 2400/517* (2023.08); *A23V 2400/519* (2023.08); *A23V 2400/533* (2023.08)

(58) Field of Classification Search
CPC ...... A23L 33/135; A23L 33/12; A23L 33/105; A23B 2/92; A23V 2400/515; A23V 2400/173; A23V 2400/113; A23V 2400/145; A23V 2400/519; A23V 2400/169; A23V 2400/143; A23V 2400/249; A23V 2400/517; A23V 2400/125; A23V 2400/175; A23V 2400/137; A23V 2400/533; A23V 2400/165; A23V 2400/147
USPC ........................................................ 426/601
See application file for complete search history.

(56) References Cited

U.S. PATENT DOCUMENTS

2014/0093614 A1 * 4/2014 Gonzalez .............. A23L 33/115
426/61

FOREIGN PATENT DOCUMENTS

| | | |
|---|---|---|
| CN | 106923345 | 7/2017 |
| KR | 10-0720817 | 5/2007 |
| KR | 10-1605516 | 3/2016 |
| KR | 10-1918089 | 11/2018 |
| KR | 10-2027029 | 9/2019 |
| KR | 10-2048690 | 11/2019 |
| KR | 10-2020-007980 | 2/2020 |
| KR | 10-2132066 | 7/2020 |

OTHER PUBLICATIONS

Medina et al., Microencapsulation of Lactobacillus plantarum by spray drying with mixtures of Aloe vera mucilage and agave fructans as wall materials, May 2020, Journal of Food Process Engineering (Year: 2020).*
Notification of the First Office Action issued Aug. 30, 2023 in corresponding Chinese Patent Application No. 202180003276.3, with English language translation.
Extended European Search Report issued Aug. 22, 2024 in European Patent Application No. 21777924.8.
International Search Report issued Sep. 9, 2021 in International (PCT) Application No. PCT/KR2021/007036.
(Continued)

*Primary Examiner* — Brent T O'Hern
(74) *Attorney, Agent, or Firm* — Wenderoth, Lind & Ponack, L.L.P.

(57) ABSTRACT

The present disclosure relates to a coated probiotic having enhanced acid tolerance, bile tolerance, gastrointestinal survivability, cold storage stability and room temperature storage stability by including milk-derived phospholipid and *Aloe vera* gel as a coating agent, a food composition containing the same, and a method for producing the same. As the coated probiotic includes the *Aloe vera* gel and the milk-derived phospholipid as the coating agent, it may have increased stabilities against external environmental stress, such as lyophilization stability and storage stability of the probiotic itself, and may have significantly enhanced acid tolerance and bile tolerance which are the indices of the gastrointestinal stability of the probiotic after taking.

4 Claims, No Drawings

(56)  References Cited

OTHER PUBLICATIONS

Ceja-Medina, L.I. et al., "Microencapsulation of *Lactobacillus plantarum* by spray drying with mixtures of *Aloe vera* mucilage and agave fructans as wall materials", Journal of Food Process Engineering, 2020, vol. 43, Issue 8, 12 pages.

Guerin, J. et al., "Milk fat globule membrane glycoproteins: Valuable ingredients for lactic acid bacteria encapsulation?", Critical Reviews in Food Science and Nutrition, 2019, vol. 59, Issue 4, 56 pages; DOI: 10.1080/10408398.2017.1386158.

Syahirah, N. et al., "Optimization of *Aloe vera* and Alginate as Encapsulating Matrices of *Lactobacillus acidophilus* using FCCD-RSM Approach", 2013 IEEE 3rd International Conference on System Engineering and Technology, Aug. 19-20, 2013, Shah Alam, Malaysia.

* cited by examiner

COATED PROBIOTIC, FOOD COMPOSITION CONTAINING THE SAME AND METHOD FOR PRODUCING THE SAME

BACKGROUND

1. Technical Field

The present disclosure relates to a coated probiotic having enhanced acid tolerance, bile tolerance, gastrointestinal survivability, cold storage stability and room temperature storage stability by including milk-derived phospholipid and *Aloe vera* gel as a coating agent, a food composition containing the same, and a method for producing the same.

2. Related Art

Lactic acid bacteria, also called *Lactobacillus*, are gram-positive bacteria that produce lactic acid by decomposing saccharides such as glucose, and are found in human or mammalian digestive tracts, oral cavities, vaginas and the like. Lactic acid bacteria are one of the microorganisms that have been widely used for the longest time by mankind, do not produce substances harmful to human or animal intestines, and are also effectively used as a medicine for intestinal disorders that prevents abnormal fermentation by harmful bacteria in the intestines.

Meanwhile, probiotics are live bacteria that enter the body and give a good effect on health, and most probiotics known to date include lactic acid bacteria. With increases in the research results and scientific data indicating that human intestinal microorganisms, including probiotics, have an important effect on human health, consumers' awareness of probiotics has been further expanded, and accordingly, the demand for probiotic products has gradually increased. To date, 19 kinds of strains, including eleven *Lactobacillus* strains (*L. acidophilus, L. casei, L. gasseri, L. delbruekii* subsp. *bulgaricus, L. helveticus, L. fermentum, L. paracasei, L. plantarum, L. reuteri, L. rhamnosus,* and *L. salivarius*), one *Lactococcus* strain (Lc. *lactis*), two *Enterococcus* strains (*E. faecium,* and *E. faecalis*), one *Streptococcus* strain (*S. thermophilus*), and four *Bifidobacterium* strains (*B. bifidum, B. breve, B. longum,* and *B. animalis* subsp. *lactis*), have been registered as probiotics in the Ministry of Food and Drug Safety, and many companies have conducted studies on probiotics and produced and sold probiotic related products. The representative functionalities of probiotics include inhibition of harmful bacteria, proliferation of lactic acid bacteria, and helping smooth bowel movements. In addition, according to numerous studies and clinical results, probiotics have an intestinal regulation effect and also have various effects against irritable bowel syndrome, atopy, constipation, and female diseases. However, these probiotics do not exhibit their original functionalities, because the bacteria themselves constituting the probiotics are composed of proteins and hence the cell membranes thereof are damaged by gastric acid and bile acid when the probiotics are taken into the body.

To overcome this problem, currently, in the industry that produces probiotics, a product containing a high concentration of a strain is being produced, or a coated strain is being produced through 3 or 4 or more additional processes (Korean Patent Nos. 10-2048690 and 10-1918089). However, the product containing a high concentration of a strain has problems in that it may impose a large burden on consumers as the price of the product rises, and that side effects may occur if more than the recommended daily intake of live bacteria is consumed. In addition, the technology of coating the strain by multi-process has disadvantages in that the unit price of the product rises due to expensive equipment and an expensive coating agent, and it is difficult to ensure the stability of probiotics, due to addition of the additional processes. Therefore, many studies are still needed to enhance the stability of probiotics.

PRIOR ART DOCUMENTS

Patent Documents

Korean Patent No. 10-2048690
Korean Patent No. 10-1918089

SUMMARY

An object of the present disclosure is to provide a coated probiotic having enhanced acid tolerance, bile tolerance, gastrointestinal survivability, cold storage stability and room temperature storage stability.

Another object of the present disclosure is to provide a food composition containing the coated probiotic.

Still another object of the present disclosure is to provide a method for producing the coated probiotic.

The present inventors have conducted studies on a new technology for enhancing the stability of probiotics, which is economical and does not require high-level technology and expensive equipment, in order to solve the problems occurring in the prior art, such as the use of an expensive coating agent and multi-process and the use of a high concentration of probiotics. As a result, the present inventors have developed a novel coated probiotic including milk-derived phospholipid and *Aloe vera* gel as coating agents for a probiotic, thereby completing the present disclosure.

One aspect of the present disclosure provides a coated probiotic including: a probiotic; and a coating agent composed of milk-derived phospholipid and *Aloe vera* gel.

As used herein, the term "probiotic" means live bacteria that enter the body and give a good effect on health. In a broader sense, the term includes even dead bacteria.

According to one embodiment of the present disclosure, the probiotic may be at least one selected from the group consisting of a *Lactobacillus* strain, a *Lactococcus* strain, an *Enterococcus* strain, a *Streptococcus* strain and a *Bifidobacterium* strain.

More specifically, the probiotic may be, but is not limited to, at least one selected from the group consisting of *Lactobacillus acidophilus, Lactobacillus casei, Lactobacillus gasseri, Lactobacillus delbrueckii* ssp. *bulgaricus, Lactobacillus helveticus, Lactobacillus fermentum, Lactobacillus paracasei, Lactobacillus plantarum, Lactobacillus reuteri, Lactobacillus rhamnosus, Lactobacillus salivarius, Lactococcus lactis, Enterococcus faecium, Enterococcus faecalis, Streptococcus thermophilus, Bifidobacterium bifidum, Bifidobacterium breve, Bifidobacterium longum,* and *Bifidobacterium animalis* ssp. *lactis.*

As used herein, the term "coating" or "coated" means covering the surface of a probiotic with a coating agent to form a coating layer, thereby protecting the probiotic or the surface of the probiotic from an external environment. Methods for coating the probiotic surface may be roughly divided into a physical vapor deposition method and a chemical vapor deposition method, and coating methods and conditions known in the art may be applied without limitation depending on the types of probiotic, coating agent, etc.

As the coating agent, any material may be used without limitation as long as it is a material capable of imparting acid tolerance, bile tolerance, gastrointestinal survivability, cold storage stability and room temperature storage stability to the probiotic. For example, the coating agent may be phospholipid, polysaccharide, protein or the like, but is not limited thereto.

According to one embodiment of the present disclosure, the coating agent may be composed of milk-derived phospholipid and *Aloe vera* gel.

The milk-derived phospholipid is a phospholipid extracted from milk fat, and examples thereof include phosphatidylcholine (PC), phosphatidylethanolamine (PE), phosphatidylinositol (PI), phosphatidic acid (PA), phosphatidylserine (PS), and sphingomyelin (SPM). In particular, the milk-derived phospholipid is characterized by containing large amounts of phosphatidylserine and sphingomyelin, which are contained in trace amounts in soybean-derived phospholipids, egg yolk-derived phospholipids, and fish-derived phospholipids (see Table 3). The phosphatidylserine may be resistant even at pH 2, and thus has excellent acid tolerance, and the sphingomyelin enhances the stability of the phospholipid bilayer. Thus, this milk-derived phospholipid containing large amounts of phosphatidylserine and sphingomyelin may contribute to enhancing the stability of the probiotic.

According to one embodiment of the present disclosure, the milk-derived phospholipid contain, based on the total weight thereof, 5% or more, preferably 5 to 20% of phosphatidylserine, and 20% or more, preferably 20 to 30% of sphingomyelin.

According to an example of the present disclosure, as a result of coating probiotics with each of milk-derived phospholipid, soybean-derived phospholipid and egg yolk-derived phospholipid as phospholipid to enhance the stability of the probiotics, it was confirmed that the probiotics coated with the milk-derived phospholipid maintained a higher survival rate than the probiotics coated with the soybean-derived phospholipid or the egg yolk-derived phospholipid under stressed conditions of 45° C. and under digestive tract conditions.

The *Aloe vera* gel is a gel separated from *Aloe vera* and is known to contain various vitamins, minerals, enzymes, fatty acids, polysaccharides, etc., and to have components different from those of the whole *Aloe vera* leaf. Examples of edible *Aloe* include *Aloe vera, Aloe arborescens*, and *Aloe saponaria* Haw., but it is known that *Aloe vera* gel is obtained only from *Aloe vera* with large leaves. This *Aloe vera* gel is known to be particularly effective in preserving and improving the shelf life of food, and thus has been used mainly as a food additive. However, a lot of research has not been done on the relationship between the growth, storage stability and survival rate of lactic acid bacteria.

According to one embodiment of the present disclosure, the *Aloe vera* gel may contain 30 mg/g or more, preferably 30 to 300 mg/g of polysaccharides in solid state, and may contain 0.005% or less, preferably 0.005 to 0.0005% of anthraquinone-based compounds (as anhydrous barbaloin).

According to an example of the present disclosure, as a result of comparing the stability of probiotics coated with *Aloe vera* gel, whole *Aloe vera* leaf or each of conventional polysaccharides (xanthan gum, locust bean gum and gum Arabic) for coating lactic acid bacteria or probiotics, it was confirmed that the probiotics coated with *Aloe vera* gel maintained a higher survival rate under stressed conditions of 45° C. than the probiotics coated with whole *Aloe vera* leaves, xanthan gum, locust bean gum, or gum Arabic.

According to one embodiment of the present disclosure, the coating agent may be obtained by mixing the *Aloe vera* gel and the milk-derived phospholipid together at a weight ratio of 1:0.1 to 2.

For example, the mixing ratio between the *Aloe vera* gel and the milk-derived phospholipid may be 1:0.1 to 2, 1:0.1 to 1.5, 1:0.1 to 1, 1:0.1 to 0.5, 1:0.5 to 2, 1:0.5 to 1.5, 1:0.5 to 1, 1:1 to 2, 1:1 to 1.5, 1:1.5 to 2, or 1:1. In order to improve the stability of the probiotic, it is preferable to use a mixture obtained by mixing the *Aloe vera* gel and the milk-derived phospholipid at a weight ratio of 1:1.

According to one embodiment of the present disclosure, the coated probiotic may include 30 to 99 parts by weight of the probiotic and 0.005 to 5 parts by weight of the coating agent.

If the coating agent is included in an amount of less than 0.005 parts by weight, the probiotic or the surface of the probiotic cannot be sufficiently coated, and thus the enhanced stability of the probiotic cannot be expected, and if the coating agent is included in an amount of more than 5 parts by weight, it may impose a burden on the digestive organs, causing adverse effects such as gastrointestinal spasm and pain, indigestion, diarrhea, and inflammation.

According to an example of the present disclosure, as a result of coating probiotics with a 1:1 (w/w) mixture of milk-derived phospholipid and *Aloe vera* gel as a coating agent, it was confirmed that the probiotics coated with the mixture of the milk-derived phospholipid and the *Aloe vera* gel maintained a higher survival rate than the probiotics coated with the milk-derived phospholipid or the *Aloe vera* gel alone, under digestive tract conditions and cold, room temperature and accelerated conditions.

According to one example of the present disclosure, the survival rate of the probiotics coated with the mixture of the milk-derived phospholipid and the *Aloe vera* gel as a coating agent increased compared to that of the probiotics before coating. For example, it may increase by 5%, 10%, 15%, 20%, 25%, 30%, 35%, 40%, 45%, or 50% or more compared to that of the probiotics before coating.

This coated probiotic may be powdered by a lyophilization process at a temperature of −10° C. or lower, thus extending the shelf life thereof.

According to one embodiment of the present disclosure, the coated probiotic may further comprise a cryoprotectant.

As the cryoprotectant, a cryoprotectant component known in the art may be used without limitation. For example, the cryoprotectant may be powdered skim milk, fructooligosaccharide, trihalose, maltodextrin, glycerin, or the like, but is not limited thereto.

According to one embodiment of the present disclosure, the coated probiotic including the probiotic, the coating agent and the cryoprotectant may include 0.1 to 10 parts by weight of the coating agent based on 100 parts by weight of the cryoprotectant.

For example, the coating agent may be included in an amount of 0.1 to 10 parts by weight, 0.1 to 5 parts by weight, 0.1 to 1 part by weight, 0.1 to 0.5 parts by weight, 0.5 to 10 parts by weight, 0.5 to 5 parts by weight, 0.5 to 1 part by weight, 1 to 10 parts by weight, 1 to 5 parts by weight, or 5 to 10 parts by weight, based on 100 parts by weight of the cryoprotectant.

According to one embodiment of the present disclosure, the coated probiotic including the probiotic, the coating agent and the cryoprotectant may include 30 to 99 parts by weight of the probiotic, and 1 to 70 parts by weight of a mixture containing the cryoprotectant and the coating agent.

If the mixture containing the cryoprotectant and the coating agent is included in an amount of less than 1 part by weight, the stability of the probiotic under freezing conditions and storage conditions cannot be expected, and if the mixture is included in an amount of more than 70 parts by weight, it may inhibit the intestinal settlement and proliferation of the probiotic or impose a burden on the digestive organs, causing adverse effects such as gastrointestinal spasm and pain, indigestion, diarrhea, and inflammation.

Another aspect of the present disclosure provides a food composition containing the coated probiotic.

The food composition may be used as a food, a food additive, a beverage, a beverage additive, fermented milk, a health functional food, or the like. When the food composition is used as a food, a food additive, a beverage, a beverage additive or a health functional food, it may be provided in the form of, but not limited to, various foods, fermented milk, meat, beverages, chocolate, snack, confectionery, pizzas, ramen, other noodles, gum, ice cream, alcoholic beverages, vitamin complexes, liquors, or other health functional food formulations. According to one embodiment of the present disclosure, the food composition is preferably at least one selected from the group consisting of fermented milk, functional drinks and health functional foods.

The food composition according to the present disclosure may contain, in addition to the coated probiotic as an active ingredient, components that are generally added in food production, for example, proteins, carbohydrates, fats, nutrients, seasonings and flavorings. Examples of the carbohydrates include conventional sugars, such as monosaccharides (e.g., glucose, fructose, etc.), disaccharides (e.g., maltose, sucrose, oligosaccharides, etc.), and polysaccharides (e.g., dextrin, cyclodextrin, etc.), and sugar alcohols such as xylitol, sorbitol and erythritol. Examples of the flavorings that may be used in the present disclosure include natural flavorings (thaumatin, *stevia* extracts, such as rebaudioside A, glycyrrhizin, etc.) and synthetic flavorings (saccharin, aspartame, etc.).

In addition, the food composition of the present disclosure may contain various nutrients, vitamins, minerals (electrolytes), flavorings such as synthetic flavorings and natural flavorings, colorants, extenders (cheese, chocolate, etc.), pectic acid and its salt, alginic acid and its salt, organic acids, protective colloidal thickeners, pH adjusting agents, stabilizers, preservatives, glycerin, alcohol, carbonizing agents that are used in carbonated beverages, etc. Such components may be used individually or in combination. The content of such additives may be selected within a range of 0 to about 20 parts by weight based on 100 parts by weight of the food composition of the present disclosure, but is not limited thereto.

Still another aspect of the present disclosure provides a method for producing the coated probiotic. More specifically, the method for producing the coated probiotic may comprise steps of: a) preparing a mixture by mixing a probiotic with a coating agent composed of milk-derived phospholipid and *Aloe vera* gel; and b) lyophilizing the mixture.

Step a) is a process of mixing a probiotic strain and a coating agent.

The description of the probiotic and the coating agent is the same as described above, and thus will be omitted to avoid overlapping description.

According to one embodiment of the present disclosure, the probiotic in step a) may be at least one selected from the group consisting of a *Lactobacillus* strain, a *Lactococcus* strain, an *Enterococcus* strain, a *Streptococcus* strain and a *Bifidobacterium* strain.

According to one embodiment of the present disclosure, the coating agent in step a) may be obtained by mixing *Aloe vera* gel and milk-derived phospholipid together at a weight ratio of 1:0.1 to 2.

According to one embodiment of the present disclosure, the mixture of step a) may include 30 to 99 parts by weight of the probiotic and 0.005 to 5 parts by weight of the coating agent.

The mixture including the probiotic and the coating agent may further comprise a cryoprotectant to protect the probiotic strain or the activity of the strain under low-temperature conditions when it is lyophilized in the subsequent step.

According to one embodiment of the present disclosure, the mixture of step a) may further comprise a cryoprotectant.

The description of the cryoprotectant is the same as that described above, and thus will be omitted to avoid overlapping description.

Uniform mixing of the probiotic and the coating agent or uniform mixing of the probiotic, the coating agent and the cryoprotectant may be performed using any mixing device known in the art without limitation. For example, the mixing may be performed using a homogenizer, an ultrasonicator or the like.

Step b) is a process of lyophilizing the mixture of the probiotic and the coating agent to dry and powder the same.

The lyophilization may be performed using a lyophilization method known in the art without limitation. At this time, the temperature and time conditions of the lyophilization may be adjusted depending on the concentration, amount, etc. of the mixture.

According to one embodiment of the present disclosure, step b) may comprise maintaining the mixture under a rapid freezing condition (−40° C. or lower) for about 4 to 24 hours, and then removing water from the mixture while thawing the mixture in a freeze dryer.

For example, the temperature condition for the lyophilization may be −40 to −70° C., −40 to −75° C., −40 to −80° C., −45 to −70° C., −45 to −75° C., −45 to −80° C., −50 to −70° C., −50 to −75° C., or −50 to −80° C., and the time condition for the lyophilization may be 12 to 24 hours, 10 to 22 hours, 8 to 20 hours, 6 to 18 hours, 4 to 16 hours, 4 to 14 hours, or 4 to 12 hours.

DETAILED DESCRIPTION

Hereinafter, the present disclosure will be described in more detail. However, this description is provided only for illustrative purposes to help understand the present disclosure, and the scope of the present disclosure is not limited by this illustrative description.

Example 1. Production of Coated
Probiotics—Different Types of Phospholipids

The types of probiotics used in this Example are shown in Table 1 below, and the composition of the cryoprotectant used in this Example is shown in Table 2 below.

TABLE 1

| No. | Probiotics |
|-----|------------|
| 1 | *L. acidophilus* HY7036 |
| 2 | *L. casei* HY2782 |
| 3 | *L. gasseri* HY7023 |
| 4 | *L. delbrueckii* ssp. *bulgaricus* HY7901 |
| 5 | *L. helveticus* HY7801 |
| 6 | *L. fermentum* HY7301 |
| 7 | *L. paracasei* HP7 |
| 8 | *L. plantarum* HY7715 |
| 9 | *L. reuteri* HY7501 |
| 10 | *L. rhamnosus* HY1213 |

TABLE 1-continued

| No. | Probiotics |
|---|---|
| 11 | *S. thermophilus* HY9012 |
| 12 | *B. bifidum* HY8308 |
| 13 | *B. breve* HY8201 |
| 14 | *B. longum* HY8001 |
| 15 | *B. animalis* ssp. *lactis* HY8002 |

TABLE 2

| Raw material name | Content (%) |
|---|---|
| Maltodextrin powder | 7 |
| Powdered skim milk | 5 |
| Purified water | 88 |
| Total | 100 |

Probiotics were prepared by culturing in an edible medium suitable for each strain according to the strain culture manual known in the art. After each of the cultured media was centrifuged at 8,000 rpm for 15 minutes, only the strains were collected. Each of the strains, a cryoprotectant and a coating agent were mixed together, and the mixture was maintained under rapid freezing conditions (−40° C. or lower) for 4 to 24 hours, and then lyophilized, thus preparing probiotic powders. As the coating agent, 1% of milk-derived phospholipid, 1% of soybean-derived phospholipid, or 1% of egg yolk-derived phospholipid was mixed was mixed with the cryoprotectant and used. 90 parts by weight of each strain and 10 parts by weight of the mixture of the cryoprotectant and the coating agent were mixed together. As a control, probiotic powder was prepared by mixing each strain and the cryoprotectant together without the coating agent.

The compositions of the milk-derived phospholipid, the soybean-derived phospholipid and the egg yolk-derived phospholipid are shown in Table 3 below.

TABLE 3

|  | Milk-derived phospholipid | Soybean-derived phospholipid | Egg yolk-derived phospholipid |
|---|---|---|---|
| Phosphatidylcholine (PC) | 26 to 28 | 23 | 73 to 75 |
| Phosphatidylethanolamine (PE) | 23 to 25 | 22 | 18 |
| Phosphatidylinositol (PI) | 7 to 8 | 8 to 14 | 2 to 3 |
| Phosphatidic acid (PA) | ≤2 | 6 | ≤1 |
| Phosphatidylserine (PS) | 8 to 12 | ≤1 | — |
| Sphingomyelin (SPM) | 25 to 26 | — | 3 |

1-1. Measurement of Survival Rates of Coated Probiotics—Accelerated Test

The prepared probiotic powders were individually packaged, and the survival rates thereof were measured through an accelerated test at 45° C., and the bacterial survival rates of the probiotic powders are shown in Table 4 below in comparison with to the number of bacteria that were not lyophilized.

TABLE 4

| Test strain name | Survival rates (%) before and after coating | | | |
|---|---|---|---|---|
|  | Untreated | Milk-derived phospholipid | Soybean-derived phospholipid | Egg yolk-derived phospholipid |
| *L. acidophilus* HY7036 | 71 | 90 | 85 | 71 |
| *L. casei* HY2782 | 65 | 89 | 82 | 66 |
| *L. gasseri* HY7023 | 75 | 94 | 83 | 73 |
| *L. delbrueckii* ssp. *bulgaricus* HY7901 | 67 | 91 | 84 | 66 |
| *L. helveticus* HY7801 | 88 | 93 | 81 | 83 |
| *L. fermentum* HY7301 | 71 | 92 | 78 | 84 |
| *L. paracasei* HP7 | 81 | 91 | 83 | 85 |
| *L. plantarum* HY7715 | 85 | 97 | 79 | 86 |
| *L. reuteri* HY7501 | 83 | 87 | 71 | 85 |
| *L. rhamnosus* HY1213 | 71 | 86 | 73 | 72 |
| *S. thermophilus* HY9012 | 73 | 86 | 74 | 75 |
| *B. bifidum* HY8308 | 69 | 84 | 71 | 76 |
| *B. breve* HY8201 | 82 | 92 | 75 | 83 |
| *B. longum* HY8001 | 86 | 90 | 85 | 85 |
| *B. animalis* ssp. *lactis* HY8002 | 65 | 83 | 69 | 66 |

As shown in Table 4 above, as a result of comparing the survival rates of the untreated strains and the strains treated with different types of phospholipids applicable to food, it was confirmed that the survival rates of the strains coated with the soybean-derived phospholipid or the egg yolk-derived phospholipid as the coating agent were similar to those of the untreated strains lyophilized without using the coating agent, but the survival rates of the strains coated with the milk-derived phospholipid increased compared to those of the untreated strains or the strains coated with the soybean-derived phospholipid or the egg yolk-derived phospholipid as the coating agent.

1-2. Measurement of Intestinal Survival Rates of Coated Probiotics

Each of the prepared probiotic powders was dissolved in PBS (phosphate buffer saline) to a final concentration of $1 \times 10^9$ cfu/ml, thus preparing samples.

With reference to M. Minekus et al. (Food Funct. 2014 (5): 1113-1124), electrolyte solutions for use in digestion models were prepared. The compositions of the electrolyte solutions are shown in Table 5 below.

TABLE 5

| | Simulated Salivary Fluid (SSF, mmol/L) | Simulated Gastric Fluid (SGF, mmol/L) | Simulated Intestinal Fluid (SIF, mmol/L) |
|---|---|---|---|
| KCl | 15.1 | 6.9 | 6.8 |
| KH$_2$PO$_4$ | 3.7 | 0.9 | 0.8 |
| NaHCO$_3$ | 13.6 | 25 | 85 |

TABLE 5-continued

| | Simulated Salivary Fluid (SSF, mmol/L) | Simulated Gastric Fluid (SGF, mmol/L) | Simulated Intestinal Fluid (SIF, mmol/L) |
|---|---|---|---|
| NaCl | — | 47.2 | 38.4 |
| MgCl$_2$(H$_2$O)$_6$ | 0.15 | 0.1 | 0.33 |
| (NH$_4$)$_2$CO$_3$ | 0.06 | 0.5 | — |
| CaCl$_2$(H$_2$O)$_2$ | 1.5 (0.75) | 0.15 (0.075) | 0.6 (0.3) |

In the oral stage, the SSF electrolyte solution and α-amylase of human saliva were added to each of the prepared samples and allowed to react at 37° C. for 2 minutes, and then the SGF electrolyte solution and porcine pepsin were added to each sample which was then adjusted a pH of 3.0, followed by reaction at 37° C. for 2 hours. In the small intestine stage, porcine pancreatin and bile acid were added to each of the above digested samples, which was then adjusted to a pH of 7.0, followed by reaction at 37° C. for 2 hours. In the final absorption step, brush border membrane vesicles were added to each of the above digested samples, which was then adjusted to a pH of 7.0, followed by reaction at 37° C. for 4 hours. To determine the number of probiotic bacteria remaining after all the digestion and absorption processes, the viable cell counts of the probiotics were analyzed according to a conventional viable lactic bacterial cell counting method, and the intestinal survival rate of each of the probiotic strains was expressed as a survival rate (%) compared to the initial bacterial cell count before digestion and absorption. The results of the measurement are shown in Table 6 below.

TABLE 6

| | Survival rates (%) before and after coating | | | |
|---|---|---|---|---|
| Test strain name | Untreated | Milk-derived phospholipid | Soybean-derived phospholipid | Egg yolk-derived phospholipid |
| L. acidophilus HY7036 | 56 | 58 | 56 | 55 |
| L. casei HY2782 | 51 | 55 | 52 | 51 |
| L. gasseri HY7023 | 46 | 49 | 47 | 46 |
| L. delbrueckii ssp. bulgaricus HY7901 | 45 | 50 | 46 | 44 |
| L. helveticus HY7801 | 35 | 35 | 31 | 33 |
| L. fermentum HY7301 | 42 | 44 | 43 | 39 |
| L. paracasei HP7 | 39 | 42 | 40 | 38 |
| L. plantarum HY7715 | 52 | 60 | 53 | 43 |
| L. reuteri HY7501 | 43 | 46 | 44 | 42 |
| L. rhamnosus HY1213 | 42 | 43 | 41 | 40 |
| S. thermophilus HY9012 | 23 | 25 | 22 | 21 |
| B. bifidum HY8308 | 36 | 39 | 35 | 18 |
| B. breve HY8201 | 32 | 37 | 31 | 20 |
| B. longum HY8001 | 21 | 32 | 22 | 18 |
| B. animalis ssp. lactis HY8002 | 45 | 50 | 46 | 39 |

As shown in Table 6 above, it was confirmed that the survival rates of the strains coated with the soybean-derived phospholipid or the egg yolk-derived phospholipid were similar to those of the untreated strains lyophilized without using the coating agent, but the survival rates of the strains coated with the milk-derived phospholipid increased compared to those of the untreated strains or the strains coated with the soybean-derived phospholipid or the egg yolk-derived phospholipid.

2. Production of Coated Probiotics—Different Types of Polysaccharides

Coated probiotics were produced in the same manner as in Example 1, except that 1% of whole *Aloe vera* leaf, xanthan gum, locust bean gum, gum Arabic or *Aloe vera* gel was used instead of the milk-derived phospholipid, the soybean-derived phospholipid or the egg yolk-derived phospholipid as the coating agent.

The whole *Aloe vera* leaf is prepared by drying and powdering *Aloe vera* after removing non-edible parts (thorns, etc.) from *Aloe vera*. According to the standards and specifications for health functional food, the whole *Aloe vera* leaf contains 2.0 to 50.0 mg/g of anthraquinone-based compounds (as anhydrous barbaloin).

The *Aloe vera* gel is prepared by removing the non-edible parts and outer skin from *Aloe vera*, and then separating, drying and powdering only the gel. According to the standards and specifications for health functional food, the *Aloe vera* gel contains 30 mg/g or more of polysaccharides in solid state and 0.005% or less of anthraquinone-based compounds (as anhydrous barbaloin).

2-1. Measurement of Survival Rates of Coated Probiotics—Accelerated Test

The bacterial survival rates of the probiotic powders were measured in the same manner as the accelerated test of Example 1-1, and the results of the measurement are shown in Table 7 below.

TABLE 7

| | Survival rates (%) before and after coating | | | | | |
| Test strain name | Untreated | Whole aloe vera leaf | Xanthan gum | Locust bean gum | Gum Arabic | Aloe vera gel |
| --- | --- | --- | --- | --- | --- | --- |
| *L. acidophilus* HY7036 | 71 | 71 | 74 | 72 | 75 | 91 |
| *L. casei* HY2782 | 65 | 66 | 68 | 65 | 66 | 90 |
| *L. gasseri* HY7023 | 75 | 72 | 76 | 77 | 73 | 95 |
| *L. delbrueckii* ssp. *bulgaricus* HY7901 | 67 | 65 | 71 | 68 | 70 | 92 |
| *L. helveticus* HY7801 | 88 | 86 | 86 | 84 | 85 | 94 |
| *L. fermentum* HY7301 | 71 | 72 | 74 | 73 | 74 | 93 |
| *L. paracasei* HP7 | 81 | 77 | 75 | 76 | 80 | 92 |
| *L. plantarum* HY7715 | 85 | 84 | 86 | 83 | 89 | 98 |
| *L. reuteri* HY7501 | 83 | 82 | 81 | 80 | 84 | 88 |
| *L. rhamnosus* HY1213 | 71 | 71 | 73 | 72 | 73 | 87 |
| *S. thermophilus* HY9012 | 73 | 74 | 76 | 74 | 70 | 88 |
| *B. bifidum* HY8308 | 69 | 70 | 70 | 72 | 72 | 85 |
| *B. breve* HY8201 | 82 | 80 | 83 | 81 | 80 | 93 |
| *B. longum* HY8001 | 86 | 85 | 84 | 84 | 81 | 91 |
| *B. animalis* ssp. *lactis* HY8002 | 91 | 90 | 92 | 89 | 86 | 98 |

As shown in Table 7 above, as a result of comparing the survival rates of the untreated probiotic strains and the probiotic strains coated with different types of polysaccharides applicable to food, it was confirmed that the survival rates of the probiotic strains coated with the whole *Aloe vera* leaf, xanthan gum, locust bean gum or gum Arabic as the coating agent were similar to those of the untreated strains lyophilized without using the coating agent, but the survival rates of the probiotic strains coated with the *Aloe vera* gel significantly increased compared to those of the untreated strains or the probiotic strains coated with the whole *Aloe vera* leaf, xanthan gum, locust bean gum or gum Arabic.

Example 3. Production of Coated Probiotics

The survival rates of probiotic strains treated with a mixture of the milk-derived phospholipid and the *Aloe vera* gel, which showed a high probiotic survival rate in Examples 1 and 2, were compared with the survival rates of probiotic strains treated with the milk-derived phospholipid or the *Aloe vera* gel alone.

Probiotic powders were produced in the same manner as in Example 1, except that the milk-derived phospholipid alone, the *Aloe vera* gel alone or 1 wt % of the mixture (0.5 wt % of the milk-derived phospholipid and 0.5 wt % of the *Aloe vera* gel) was used instead of the milk-derived phospholipid, the soybean-derived phospholipid or the egg yolk-derived phospholipid as the coating agent.

3-1. Measurement of Survival Rates of Coated Probiotics—Accelerated Test

The bacterial survival rates of the probiotic powders were measured in the same manner as the accelerated test of Example 1-1, and the results of the measurement are shown in Table 8 below.

TABLE 8

| | Survival rates (%) before coating and after coating | | | |
| Test strain name | Untreated | Milk-derived phospholipid | Aloe vera gel | Treated with mixture |
| --- | --- | --- | --- | --- |
| *L. acidophilus* HY7036 | 71 | 90 | 91 | 90 |
| *L. casei* HY2782 | 65 | 89 | 90 | 89 |
| *L. gasseri* HY7023 | 75 | 94 | 95 | 94 |
| *L. delbrueckii* ssp. *bulgaricus* HY7901 | 67 | 91 | 92 | 91 |
| *L. helveticus* HY7801 | 88 | 93 | 94 | 93 |
| *L. fermentum* HY7301 | 71 | 92 | 93 | 92 |
| *L. paracasei* HP7 | 81 | 91 | 92 | 91 |
| *L. plantarum* HY7715 | 85 | 97 | 98 | 97 |
| *L. reuteri* HY7501 | 83 | 87 | 88 | 87 |
| *L. rhamnosus* HY1213 | 71 | 86 | 87 | 86 |
| *S. thermophilus* HY9012 | 73 | 86 | 88 | 91 |
| *B. bifidum* HY8308 | 69 | 84 | 85 | 84 |
| *B. breve* HY8201 | 82 | 92 | 93 | 92 |
| *B. longum* HY8001 | 86 | 90 | 91 | 90 |
| *B. animalis* ssp. *lactis* HY8002 | 65 | 83 | 84 | 83 |

As shown in Table 8 above, it was confirmed that the survival rates of the probiotic strains treated with the mixture of the milk-derived phospholipid and the *Aloe vera* gel as the coating agent were similar to those of the probiotic strains treated with the milk-derived phospholipid alone or the *Aloe vera* gel alone.

3-2. Measurement of Intestinal Survival Rates of Coated Probiotics

The bacterial survival rates of the probiotic powders were measured in the same manner as the intestinal survival rate measurement described in Example 1-2, and the results of the measurement are shown in Table 9.

TABLE 9

| | Survival rates (%) before coating and after coating | | | |
| Test strain name | Untreated | Milk-derived phospholipid | Aloe vera gel | Treated with mixture |
| --- | --- | --- | --- | --- |
| *L. acidophilus* HY7036 | 56 | 58 | 59 | 61 |
| *L. casei* HY2782 | 51 | 55 | 58 | 59 |
| *L. gasseri* HY7023 | 46 | 49 | 47 | 50 |
| *L. delbrueckii* ssp. *bulgaricus* HY7901 | 45 | 50 | 48 | 51 |
| *L. helveticus* HY7801 | 35 | 35 | 36 | 38 |
| *L. fermentum* HY7301 | 42 | 44 | 46 | 47 |
| *L. paracasei* HP7 | 39 | 42 | 44 | 45 |
| *L. plantarum* HY7715 | 52 | 60 | 59 | 62 |
| *L. reuteri* HY7501 | 43 | 46 | 45 | 48 |
| *L. rhamnosus* HY1213 | 42 | 43 | 46 | 47 |
| *S. thermophilus* HY9012 | 23 | 25 | 26 | 28 |
| *B. bifidum* HY8308 | 36 | 39 | 40 | 42 |

TABLE 9-continued

| | Survival rates (%) before coating and after coating | | | |
|---|---|---|---|---|
| Test strain name | Untreated | Milk-derived phospholipid | Aloe vera gel | Treated with mixture |
| *B. breve* HY8201 | 32 | 37 | 36 | 39 |
| *B. longum* HY8001 | 21 | 32 | 35 | 36 |
| *B. animalis* ssp. *lactis* HY8002 | 45 | 50 | 52 | 53 |

As shown in Table 9 above, it was confirmed that the survival rates of the probiotic strains treated with the mixture of the milk-derived phospholipid and the *Aloe vera* gel as the coating agent slightly increased compared to those of the probiotic strains treated with the milk-derived phospholipid alone or the *Aloe vera* gel alone.

3-3. Measurement of Survival Rates of Coated Probiotics— Different Temperature Conditions The produced probiotic powders were stored for 1 month under cold conditions (temperature: 10° C. or lower, and humidity: 40% or less), room temperature conditions (temperature: 25° C., humidity: 40 to 60%) and accelerated conditions (temperature: 40° C., and humidity: 70%), and then the viable cell counts thereof were analyzed according to a conventional probiotic viable cell counting method, and the intestinal survival rate of each of the probiotic strains was expressed as a survival rate (%) compared to the viable cell count immediately after lyophilization.

TABLE 10

| | Survival rate (%) under cold conditions after lyophilization | | | |
|---|---|---|---|---|
| Test strain name | Untreated | Milk-derived phospholipid | Aloe vera gel | Treated with mixture |
| *L. acidophilus* HY7036 | 90 | 97 | 96 | 99 |
| *L. casei* HY2782 | 93 | 95 | 94 | 97 |
| *L. gasseri* HY7023 | 92 | 97 | 96 | 99 |
| *L. delbrueckii* ssp. *bulgaricus* HY7901 | 89 | 94 | 95 | 97 |
| *L. helveticus* HY7801 | 91 | 92 | 97 | 97 |
| *L. fermentum* HY7301 | 90 | 92 | 96 | 96 |
| *L. paracasei* HP7 | 89 | 96 | 95 | 98 |
| *L. plantarum* HY7715 | 93 | 95 | 99 | 99 |
| *L. reuteri* HY7501 | 91 | 92 | 97 | 97 |
| *L. rhamnosus* HY1213 | 84 | 91 | 90 | 93 |
| *S. thermophilus* HY9012 | 82 | 89 | 88 | 91 |
| *B. bifidum* HY8308 | 93 | 95 | 99 | 99 |
| *B. breve* HY8201 | 88 | 95 | 94 | 97 |
| *B. longum* HY8001 | 81 | 88 | 87 | 90 |
| *B. animalis* ssp. *lactis* HY8002 | 83 | 90 | 89 | 92 |

TABLE 11

| | Survival rate (%) under room temperature conditions after lyophilization | | | |
|---|---|---|---|---|
| Test strain name | Untreated | Milk-derived phospholipid | Aloe vera gel | Treated with mixture |
| *L. acidophilus* HY7036 | 63 | 77 | 76 | 79 |
| *L. casei* HY2782 | 64 | 78 | 77 | 80 |
| *L. gasseri* HY7023 | 63 | 78 | 79 | 81 |
| *L. delbrueckii* ssp. *bulgaricus* HY7901 | 63 | 80 | 78 | 81 |
| *L. helveticus* HY7801 | 64 | 79 | 81 | 82 |
| *L. fermentum* HY7301 | 66 | 81 | 83 | 84 |
| *L. paracasei* HP7 | 62 | 77 | 75 | 78 |
| *L. plantarum* HY7715 | 61 | 76 | 74 | 77 |
| *L. reuteri* HY7501 | 59 | 74 | 76 | 77 |
| *L. rhamnosus* HY1213 | 62 | 76 | 74 | 77 |
| *S. thermophilus* HY9012 | 56 | 71 | 73 | 74 |
| *B. bifidum* HY8308 | 61 | 76 | 74 | 77 |

TABLE 11-continued

| | Survival rate (%) under room temperature conditions after lyophilization | | | |
| Test strain name | Untreated | Milk-derived phospholipid | Aloe vera gel | Treated with mixture |
| --- | --- | --- | --- | --- |
| B. breve HY8201 | 66 | 80 | 83 | 84 |
| B. longum HY8001 | 61 | 76 | 74 | 77 |
| B. animalis ssp. lactis HY8002 | 70 | 86 | 88 | 89 |

TABLE 12

| | Survival rate (%) under accelerated conditions after lyophilization | | | |
| Test strain name | Untreated | Milk-derived phospholipid | Aloe vera gel | Treated with mixture |
| --- | --- | --- | --- | --- |
| L. acidophilus HY7036 | 61 | 68 | 70 | 71 |
| L. casei HY2782 | 54 | 69 | 71 | 72 |
| L. gasseri HY7023 | 53 | 71 | 70 | 73 |
| L. delbrueckii ssp. bulgaricus HY7901 | 55 | 70 | 72 | 73 |
| L. helveticus HY7801 | 54 | 69 | 71 | 72 |
| L. fermentum HY7301 | 56 | 74 | 73 | 76 |
| L. paracasei HP7 | 52 | 70 | 69 | 72 |
| L. plantarum HY7715 | 51 | 70 | 68 | 71 |
| L. reuteri HY7501 | 52 | 64 | 66 | 67 |
| L. rhamnosus HY1213 | 51 | 66 | 68 | 69 |
| S. thermophilus HY9012 | 53 | 61 | 63 | 64 |
| B. bifidum HY8308 | 51 | 66 | 68 | 69 |
| B. breve HY8201 | 55 | 70 | 72 | 73 |
| B. longum HY8001 | 55 | 66 | 68 | 69 |
| B. animalis ssp. lactis HY8002 | 61 | 76 | 78 | 79 |

As shown in Tables 10 to 12 above, it was confirmed that, when the probiotic powders were cold-stored, the survival rates of the probiotic strains treated with the mixture of the milk-derived phospholipid and the *Aloe vera* gel as the coating agent slightly increased compared to those of the untreated strains lyophilized without using the coating agent. In addition, it was confirmed that, when the probiotic powders were stored under the room temperature or accelerated conditions, the survival rates of the strains generally decreased, but the survival rates of the probiotic strains treated with the mixture of the milk-derived phospholipid and the *Aloe vera* gel as the coating agent were maintained at higher levels than those of the strains treated with the milk-derived phospholipid alone or the *Aloe vera* gel alone.

These results suggest that the use of the mixture of the milk-derived phospholipid and the *Aloe vera* gel as the coating agent helps to increase the survival rates of the strains under the cold, room temperature or accelerated conditions.

As described above, as the coated probiotic according to the present disclosure includes the *Aloe vera* gel and the milk-derived phospholipid as the coating agent, it may have increased stabilities against external environmental stress, such as lyophilization stability and storage stability of the probiotic itself, and may have significantly enhanced acid tolerance and bile tolerance which are the indices of the gastrointestinal stability of the probiotic after taking.

So far, the present disclosure has been described with reference to the embodiments thereof. Those of ordinary skill in the art to which the present disclosure pertains will appreciate that the present disclosure may be embodied in modified forms without departing from the essential characteristics of the present disclosure. Therefore, the disclosed embodiments should be considered from an illustrative point of view, not from a restrictive point of view. The scope of the present disclosure is defined by the claims rather than the foregoing description, and all differences within the scope equivalent thereto should be construed as being included in the present disclosure.

What is claimed is:

1. A lyophilized coated probiotic comprising:
   30 to 99 parts by weight of a probiotic; and
   0.005 to 5 parts by weight of a coating agent composed of milk-derived phospholipid and aloe vera gel,
   wherein the milk-derived phospholipid contains, based on the total weight thereof, 5 to 20% of phosphatidylserine, and 20 to 30% of sphingomyelin.

2. The coated probiotic of claim 1, wherein the probiotic is at least one selected from the group consisting of a *Lactobacillus* strain, a *Lactococcus* strain, an *Enterococcus* strain, a *Streptococcus* strain, and a *Bifidobacterium* strain.

3. The coated probiotic of claim 1, wherein the coating agent is obtained by mixing the aloe vera gel and the milk-derived phospholipid together at a weight ratio of 1:0.1 to 2.

4. The coated probiotic of claim 1, further comprising a cryoprotectant.

* * * * *